United States Patent [19]

Watanabe

[11] Patent Number: 5,701,203

[45] Date of Patent: Dec. 23, 1997

[54] ASTIGMATISM CORRECTING ELEMENT

[75] Inventor: Fumio Watanabe, Omiya, Japan

[73] Assignee: Fuji PhotoOptical Co. Ltd., Omiya, Japan

[21] Appl. No.: 588,722

[22] Filed: Jan. 19, 1996

[30] Foreign Application Priority Data

Apr. 24, 1995 [JP] Japan ................................. 7-098457

[51] Int. Cl.$^6$ .............................. G02B 13/10; G02B 5/04
[52] U.S. Cl. ................................ 359/669; 359/837
[58] Field of Search ........................ 359/669, 831, 359/837

[56] References Cited

U.S. PATENT DOCUMENTS

4,017,160  4/1977  Betensky ............................ 359/669

*Primary Examiner*—Scott J. Sugarman
*Attorney, Agent, or Firm*—Ronald R. Snider

[57] ABSTRACT

In an image-forming optical system in which an astigmatism may occur, an astigmatism correcting element disposed between an image-forming lens (20) and an image-forming surface (12) in order to correct the astigmatism is constructed such that it can correct the T image surface toward both plus and minus directions with respect to the S image surface, while easily correcting the astigmatism even when there is fluctuation in the generated astigmatism. The astigmatism correcting element comprises a prism unit (22) in which a pair of wedge-like prisms (22a, 22b) having an identical apex angle are oppositely placed in reverse to each other with a predetermined air space (d) therebetween. Also, this prism unit (22) is disposed such that its optical axis (X1) can be tilted with respect to a main ray (X2) of a bundle of rays subjected to astigmatism correction. The angle of inclination of the optical axis (X1) of the prism unit (22) may be appropriately set so as to nullify the astigmatism of the bundle of rays subjected to astigmatism correction or to intentionally provide a desired astigmatism in this bundle of rays, regardless of whether the main ray (X2) in the bundle of rays subjected to astigmatism correction is on the optical axis (X0) of the image-forming optical system or not.

4 Claims, 7 Drawing Sheets

ASTIGMATISM CORRECTING ELEMENT

BACKGROUND OF THE INVENTION

1. Field of the Invention

The present invention relates to an astigmatism correcting element which is disposed between an image-forming lens and an image-forming surface in an image-forming optical system, in which an astigmatism may occur, in order to correct the astigmatism.

2. Description of the Prior Art

Figure 6:
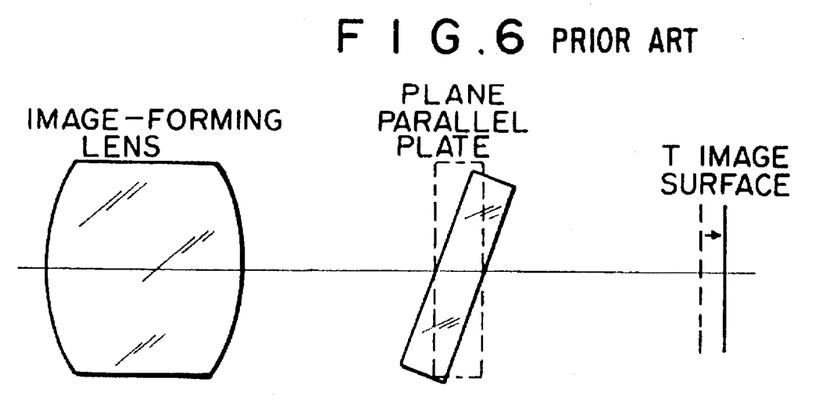
FIG. 6 is a drawing showing a conventional example of the astigmatism correcting element.

In optical systems using a line sensor, it has conventionally been proposed to dispose a plane parallel plate, with a predetermined angle of inclination, between an image-forming lens and an image-forming surface so as to correct astigmatism caused by error in manufacture of the image-forming lens and the like. This technique utilizes a property that, when a plane parallel plate is disposed with an inclination in an image-forming optical system, the T (tangential) image surface can be corrected toward plus direction with respect to the S (sagittal) image surface as shown in FIG. 6.

Figure 7:
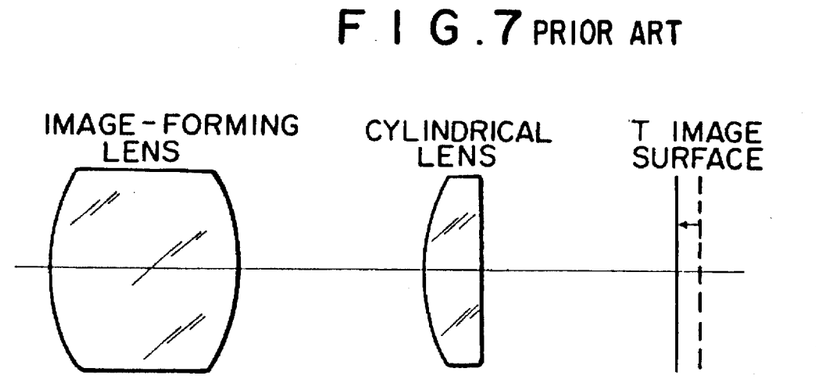
FIG. 7 is a drawing showing a conventional example of the astigmatism correcting element.

Also, as another technique for correcting astigmatism in the optical system using a line sensor, it has been known to dispose a cylindrical lens between the image-forming lens and the image-forming surface as shown in FIG. 7. The T image surface can be corrected toward minus direction with respect to the S image surface when a cylindrical convex lens is used as depicted, whereas T image surface can be corrected toward minus direction with respect to the S image surface when a cylindrical concave lens is used.

Figure 8:
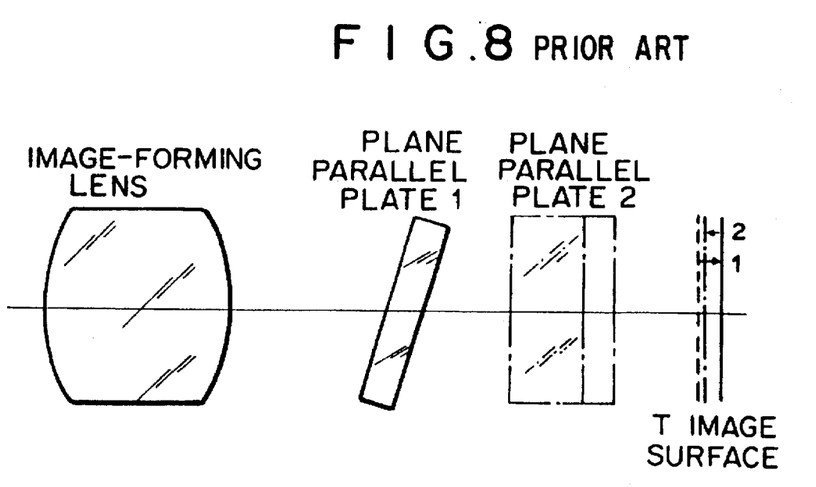
FIG. 8 is a drawing showing a conventional example of the astigmatism correcting element.

However, in the astigmatism correcting technique in which a plane parallel plate is used, the T image surface can be corrected only toward plus direction with respect to the S image surface even when the plane parallel plate is tilted. In order for this technique to enable correction toward minus direction as well, two plane parallel plates have to be placed in an orthogonal relationship to each other as shown in FIG. 8. In this case, there is a problem that a large space is necessary for correcting astigmatism.

On the other hand, in the astigmatism correcting technique in which a cylindrical lens is used, there is a problem that a plurality of cylindrical lenses have to be prepared when there is fluctuation in the generated astigmatism.

SUMMARY OF THE INVENTION

In view of the foregoing circumstances, the object of the present invention is to provide an astigmatism correcting element which can correct the T image surface toward both plus and minus directions with respect to the S image surface, while easily correcting an astigmatism even when there is fluctuation in the generated astigmatism.

In the present invention, the constitution of the astigmatism correcting element is improved in order to attain the above-mentioned object.

Namely, in an image-forming optical system in which an astigmatism may occur, the present invention is based on an astigmatism correcting element which is disposed between an image-forming lens and an image-forming surface in order to correct the above-mentioned astigmatism.

The astigmatism correcting element in accordance with the first aspect of the present invention comprises a prism unit in which a pair of wedge-like prisms having an identical apex angle are oppositely placed in reverse to each other with a predetermined air space therebetween, while the optical axis of the prism unit is tilted by a predetermined angle with respect to the optical axis of the image-forming optical system.

In the astigmatism correcting element in accordance with the second aspect of the present invention, the optical axis of the above-mentioned prism unit is tilted by a predetermined angle with respect to a main ray in a bundle of rays subjected to astigmatism correction.

The astigmatism correcting element in accordance with the third aspect of the present invention comprises the above-mentioned prism unit and a prism unit supporting means which supports the prism unit such that the optical axis thereof can be tilted with respect to the optical axis of the image-forming optical system.

The astigmatism correcting element in accordance with the fourth aspect of the present invention comprises the above-mentioned prism unit and a prism unit supporting means which supports the prism unit such that the optical axis thereof can be tilted with respect to the optical axis of a main ray in a bundle of rays subjected to astigmatism correction.

Here, "optical axis of the prism unit" refers to an axis extending in the direction normal to the light-receiving surface of the prism unit.

Since the astigmatism correcting element in accordance with the present invention comprises, as indicated in the foregoing, a prism unit in which a pair of wedge-like prisms having an identical apex angle are oppositely placed in reverse to each other with a predetermined air space therebetween, the following effects are attained.

Namely, when the above-mentioned prism unit is disposed such that the optical axis thereof is in parallel to the optical axis of the image-forming optical system, the air gap plane formed between the pair of wedge-like prisms becomes a plane which is tilted with respect to the plane orthogonal to the optical axis of the image-forming optical system, thereby generating an astigmatism in the bundle of rays passing through this prism unit by which the T image surface moves toward minus direction with respect to the S image surface. On the other hand, when the prism unit is tilted, from the state where the optical axis thereof is placed in parallel to the optical axis of the image-forming optical system, toward a direction in which the air gap plane approaches a position orthogonal to the optical axis of the image-forming optical system, the astigmatism of the bundle of rays passing through the prism unit is corrected such that the T image surface is shifted toward plus direction with respect to the S image surface as in the case where the plane parallel plate is tilted. Accordingly, when the prism unit is tilted, from the state where the optical axis thereof is placed in parallel to the optical axis of the image-forming optical system, by a certain angle (referred to as "standard angle" in the following) toward the above-mentioned direction, the astigmatism becomes zero. When the angle of inclination of the prism unit is made greater than the above-mentioned standard angle, the astigmatism is corrected such that the T image surface is shifted toward plus direction with respect to the S image surface. On the other hand, when the angle of inclination of the prism unit is made smaller than the above-mentioned standard angle, the astigmatism is corrected such that the T image surface is shifted toward minus direction with respect to the S image surface.

Accordingly, as in the first aspect of the present invention, when the prism unit is disposed such that the optical axis thereof is tilted by a predetermined angle with respect to the optical axis of the image-forming optical system, this "predetermined angle" may be appropriately set so as to nullify the astigmatism of the bundle of rays on the optical axis of the image-forming optical system or to intentionally provide a desired astigmatism in this bundle of rays.

Also, as in the second aspect of the present invention, when the prism unit is disposed such that the optical axis thereof is tilted by a predetermined angle with respect to the main ray of the bundle of rays subjected to astigmatism correction, this "predetermined angle" may be appropriately set so as to nullify the astigmatism of the bundle of rays subjected to astigmatism correction or to intentionally provide a desired astigmatism in this bundle of rays, regardless of whether the main ray in the bundle of rays subjected to astigmatism correction is on the optical axis of the image-forming optical system or not.

Further, as in the third aspect of the present invention, when the prism unit has a prism unit supporting means which supports the prism unit such that the optical axis thereof can be tilted with respect to the optical axis of the image-forming optical system, this prism unit supporting means may be used to appropriately set the angle of inclination of the optical axis of the prism unit so as to nullify the astigmatism of the bundle of rays on the optical axis of the image-forming optical system or to intentionally provide a desired astigmatism in this bundle of rays.

Also, as in the fourth aspect of the present invention, when the prism unit has a prism unit supporting means which supports the prism unit such that the optical axis thereof can be tilted with respect to the main ray in the bundle of rays subjected to astigmatism correction, this prism unit supporting means may be used to appropriately set the angle of inclination of the optical axis of the prism unit so as to nullify the astigmatism of the bundle of rays subjected to astigmatism correction or to intentionally provide a desired astigmatism in this bundle of rays, regardless of whether the main ray in the bundle of rays subjected to astigmatism correction is on the optical axis of the image-forming optical system or not.

In view of the foregoing, in accordance with the present invention, correction of an astigmatism which is hard to correct or remains in designing of a lens as well as an astigmatism occurring in manufacture of a lens due to error in manufacture or eccentricity in the lens can be easily effected in a simple and compact constitution. Also, when an astigmatism is to be intentionally generated in an auto-focus mechanism (or for general positional detection), it can be easily effected in a simple and compact constitution.

Though the astigmatism correcting element in accordance with the present invention is most effectively used in optical systems using a spot sensor or line sensor (i.e., one-dimensional sensor), it can also be used effectively in optical systems using a two-dimensional sensor as long as their pupil position is relatively far.

While the astigmatism correcting element in accordance with the present invention comprises a prism unit in which a pair of wedge-like prisms having an identical apex angle are oppositely placed in reverse to each other with a predetermined air space therebetween, it is not always necessary for the air space to be formed with an accurate parallelism since, even when both wedge-like prisms do not have an accurate parallelism, the prism unit may be tilted so as to enable astigmatism correction. Also, for the same reason, it is not always necessary for the above-mentioned pair of wedge-like prisms to have an accurately identical apex angle.

BRIEF DESCRIPTION OF THE DRAWINGS

FIGS. 1 (a) to (c) are schematic views showing an astigmatism correcting element in accordance with an embodiment of the present invention together with an image-forming optical system;

FIGS. 9 (a) and (b) are drawings showing conventional examples of the astigmatism correcting element corresponding to that of FIGS. 1 (a) to (c).

DESCRIPTION OF THE PREFERRED EMBODIMENTS

In the following, embodiments of the present invention will be explained with reference to the attached drawings.

Figure 1A:
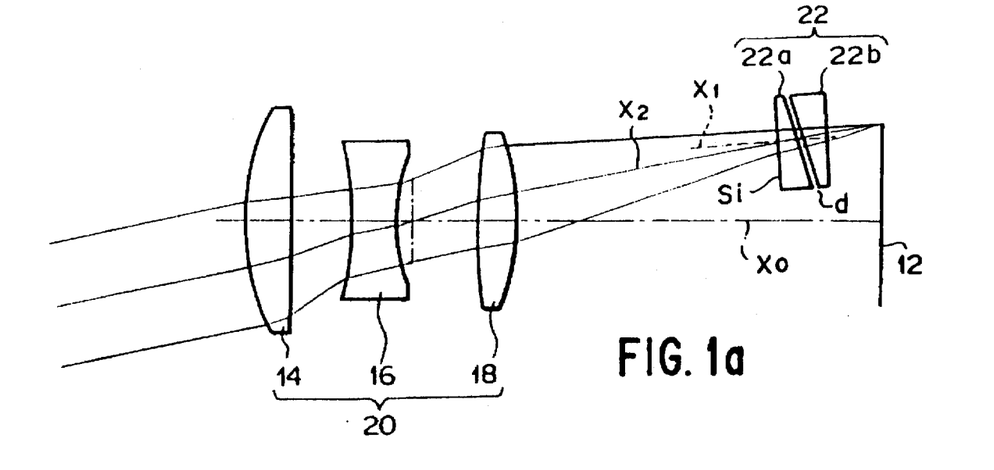
Figure 1B:
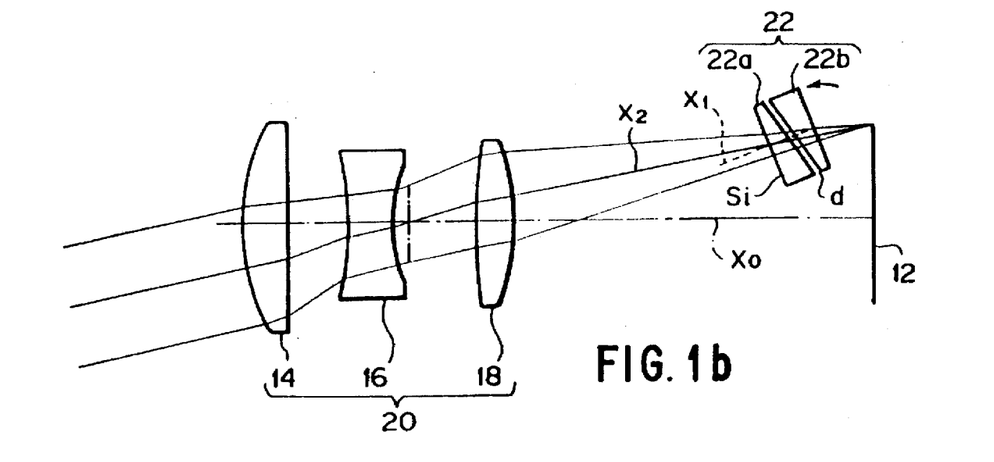
Figure 1C:
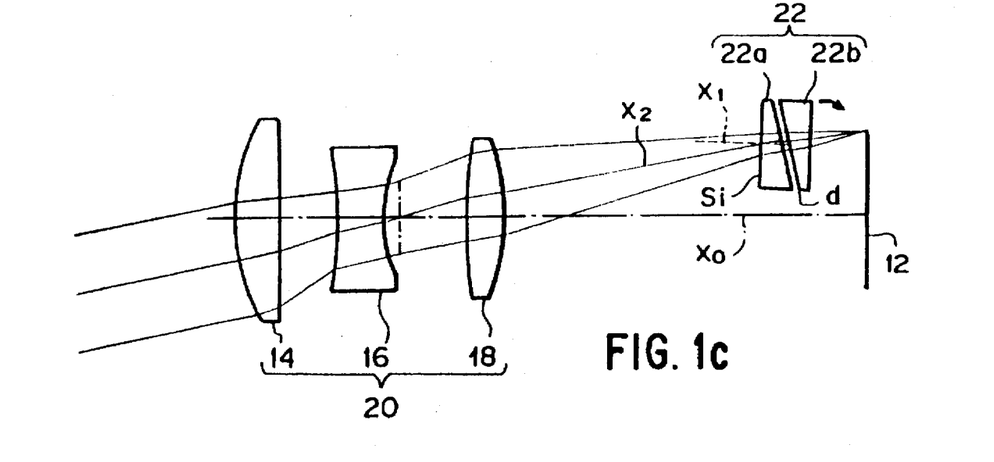

FIGS. 1 (a) to (c) are schematic views showing an astigmatism correcting element in accordance with an embodiment of the present invention together with an image-forming optical system.

As shown in these drawings, this image-forming optical system comprises an image-forming lens 20 which is disposed in front of an image-forming surface 12 and composed of a convex lens 14, a concave lens 16, and a convex lens 18. Between the image-forming lens 20 and the image-forming surface 12, a prism unit 22 is disposed as an astigmatism correcting means for correcting an astigmatism occurring in a bundle of rays passing through the image-forming lens 20. The above-mentioned prism unit 22 comprises a pair of wedge-like prisms 22a and 22b having an identical apex angle oppositely disposed vertically in reverse to each other with an air space d therebetween.

As depicted, the prism unit 22 is disposed at a position deviated upward from an optical axis X0 of the above-mentioned image-forming optical system. Also, it is supported by a prism unit supporting means, which is not depicted, so as to be rotatable around an axis orthogonal to the paper surface.

In such a constitution, when the prism 22 is disposed such that its optical axis X1 is placed in parallel to a main ray X2 of the bundle of rays incident on the prism unit 22, the air gap plane formed between the pair of wedge-like prisms 22a and 22b becomes a plane which is tilted with respect to a plane orthogonal to the main ray X2. Accordingly, an astigmatism in which the T image surface is shifted toward minus direction with respect to the S image surface occurs in the bundle of rays passing through the prism unit 22. On the other hand, when the prism unit 22 is tilted, from the state where its optical axis X2 is placed in parallel to the main ray X2, toward a direction in which the air gap plane approaches a position which is orthogonal to the main my X2, the astigmatism of the bundle of rays passing through the prism unit 22 is corrected such that the T image surface is shifted toward plus direction with respect to the S image surface as in the case where a plane parallel plate is filled. Accordingly, when the prism unit 22 is filled by a certain angle (i.e., standard angle) from the above-mentioned state, the T image surface coincides with the S image surface so as to nullify the astigmatism. Then, when the angle of inclination of the prism unit 22 is made greater than the above-mentioned standard angle, the astigmatism is corrected such that the T image surface is shifted toward plus direction with respect to the S image surface; whereas, when the angle of inclination of the prism unit 22 is made smaller than the above-mentioned standard angle, the astigmatism is corrected such that the T image surface is shifted toward minus direction with respect to the S image surface.

In this embodiment, when the prism unit 22 has the angle of inclination shown in FIG. 1 (a), the T image surface coincides with the S image surface (i.e., the amount of defocus becomes zero) so as to nullify the astigmatism of the prism unit 22.

Figure 2:
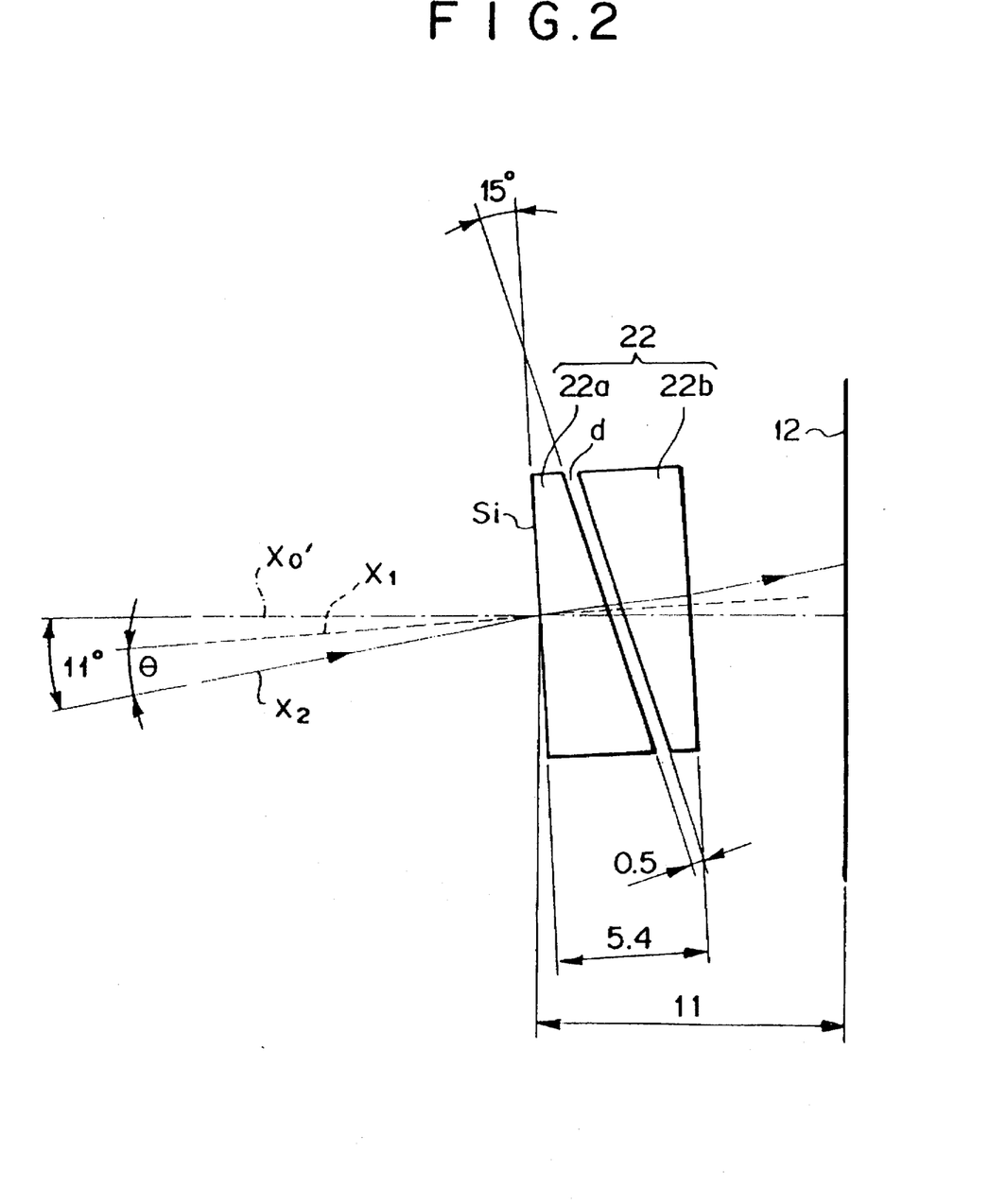
FIG. 2 is an enlarged view showing the prism unit in the above-mentioned embodiment in detail.
Figure 3:
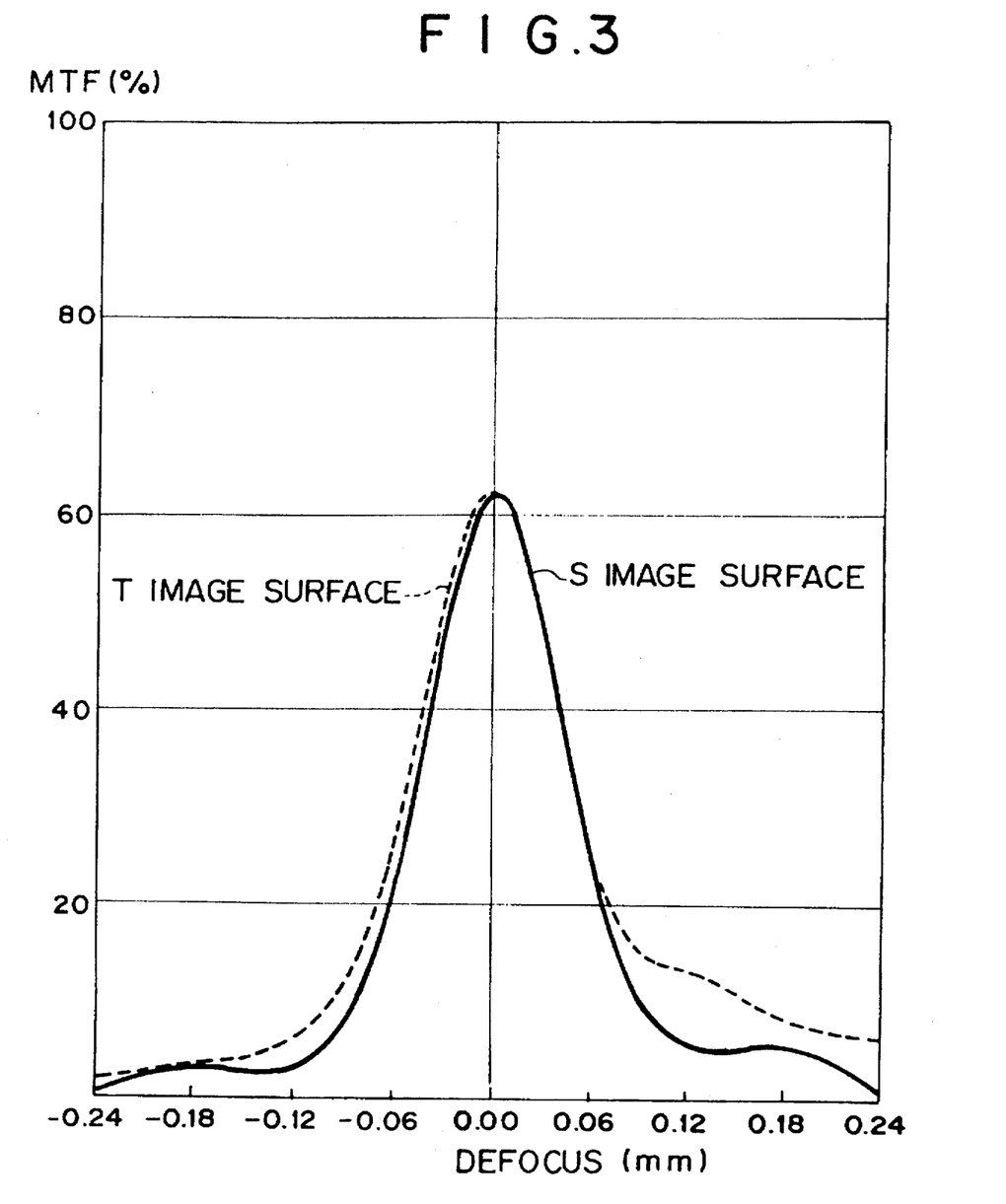
FIG. 3 is a graph showing the operation of the constitution in FIG. 1 (a)

FIG. 2 is an enlarged view showing the prism unit 22 which is at the angle of inclination (i.e., standard angle) shown in FIG. 1 (a).

In the embodiment shown in FIG. 2, the apex of each of the wedge-like prisms 22a and 22b in the prism unit 22 is 15 degrees and its air space d is 0.5 mm. This air space d is formed such that the upper portion is tilted forward with respect to a light-receiving surface Si. The whole thickness of the prism unit 22 is 5.4 mm including the air space d. The distance between the point of incidence on the light-receiving surface Si and the image-forming surface is 11 mm. The main ray X2 incident on the prism unit 22 forms an intersection angle of 11 degrees with an axis X0' which is in parallel to the optical axis X0 of the image-forming optical system. In this case, an angle θ formed by the optical axis X1 of the prism unit 22 (i.e., axis extending in the direction normal to the light-receiving surface Si) with the main ray X2 of the incident bundle of rays becomes a value smaller than 11 degrees.

Figure 4:
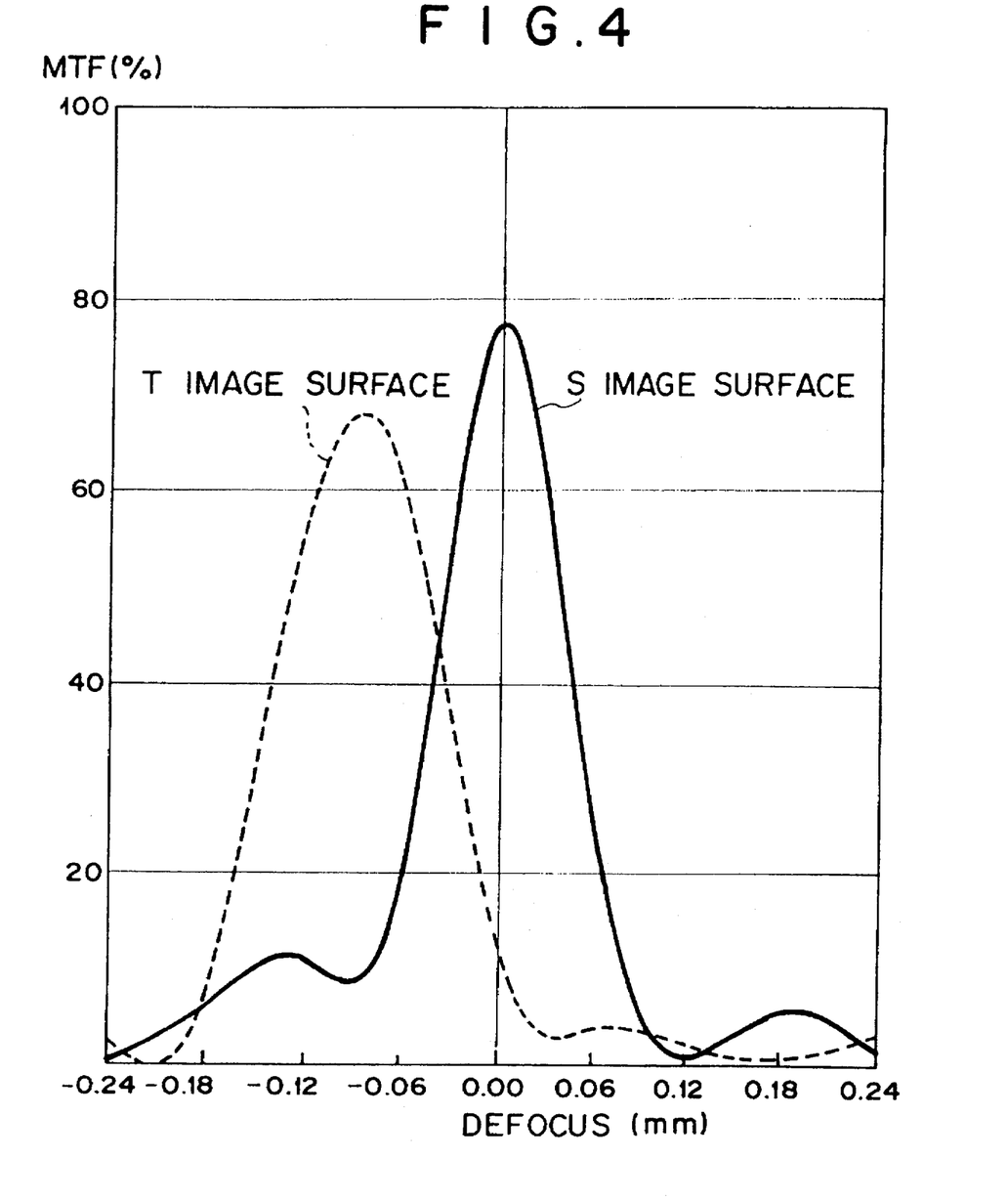
FIG. 4 is a graph showing the operation of the constitution in FIG. 1 (b)
Figure 5:
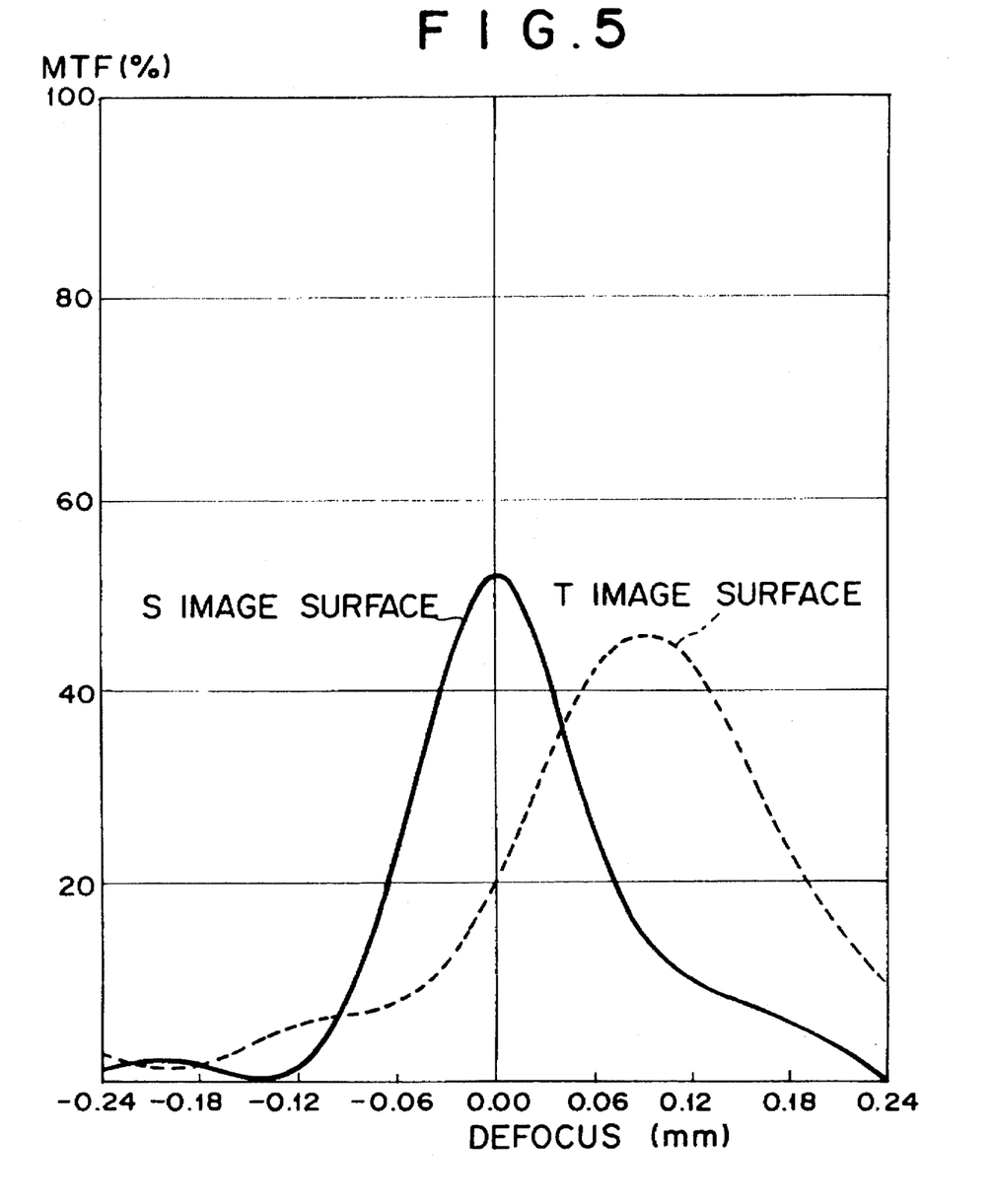
FIG. 5 is a graph showing the operation of the constitution in FIG. 1 (c)

When the prism unit 22 is tilted counterclockwise, as shown in FIG. 1 (b), from the above-mentioned standard angle, the T image surface is defocused toward minus direction (i.e., on the image-forming lens side or on the "under" side) with respect to the S image surface as shown in FIG. 4. On the other hand, when the prism unit 22 is tilted clockwise, as shown in FIG. 1 (c), from the above-mentioned standard angle, the T image surface is defocused toward plus direction (i.e., on the anti-image-forming lens side or on the "over" side) with respect to the S image surface as shown in FIG. 5.

As explained in detail in the foregoing, in this embodiment, in the image-forming optical system in which an astigmatism may occur, the prism unit 22 in which a pair of the wedge-like prisms 22a and 22b having an identical apex angle are oppositely placed in reverse to each other with the predetermined air space d therebetween is used as an astigmatism correcting element disposed between the image-forming lens 20 and the image-forming surface 12 in order to correct the astigmatism. Also, since the prism unit 22 is disposed such that its optical axis X1 can be tilted with respect to the main ray X2 of the bundle of rays subjected to astigmatism correction, the angle of inclination of the optical axis X1 of the prism unit 22 may be appropriately set so as to nullify the astigmatism of the bundle of rays subjected to astigmatism correction or to intentionally provide a desired astigmatism in this bundle of rays, regardless of whether the main ray X2, in the bundle of rays subjected to astigmatism correction is on the optical axis X0 of the image-forming optical system or not.

Figure 9A:
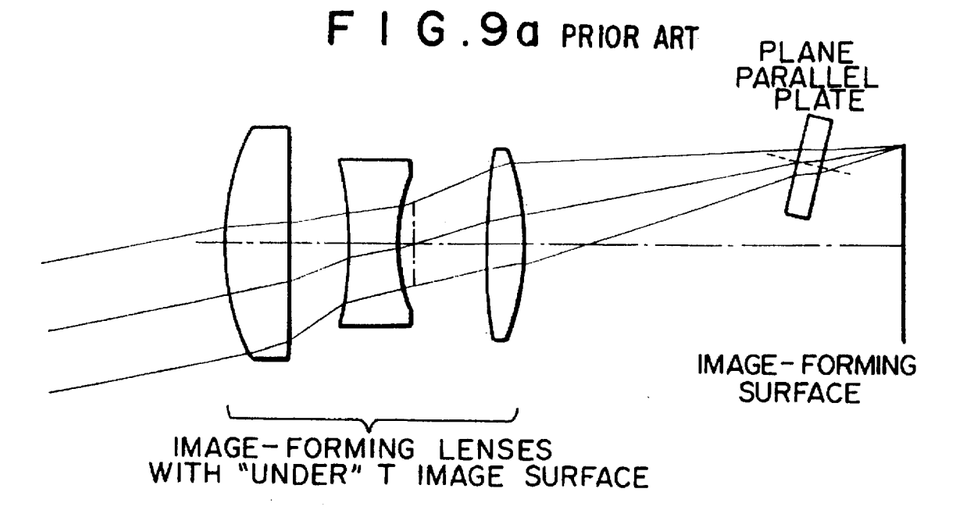
Figure 9B:
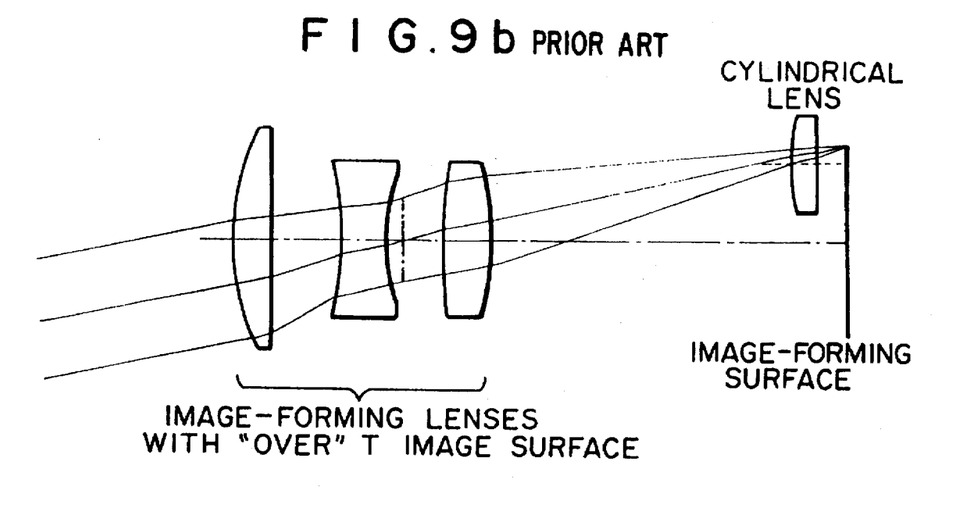

FIGS. 9 (a) and (b) are drawings showing conventional examples corresponding to the above-mentioned embodiment. In FIG. 9 (a), a plane parallel plate is disposed in place of the prism unit 22 so as to reduce the astigmatism of an image-forming lens whose T image surface is on the "under" side. In FIG. 9 (b), a cylindrical lens (i.e., plano-convex lens) is disposed in place of the prism unit 22 so as to reduce the astigmatism of an image-forming lens whose T image surface is on the "over" side.

What is claimed is:

1. An image-forming optical system the combination comprising:

an astigmatism correcting element disposed between an image-forming lens and an image-forming surface in order to correct said astigmatism; and wherein said element comprises a prism unit in which a pair of wedge-like prisms having an identical apex angle are oppositely placed in reverse to each other with a fixed predetermined air space therebetween, while an optical axis of said prism unit is tilted by a predetermined angle with respect to an optical axis of said image-forming optical system.

2. In an image-forming optical system the combination comprising:

an astigmatism correcting element disposed between an image-forming lens and an image-forming surface in order to correct said astigmatism; and wherein said element comprises a prism unit in which a pair of wedge-like prisms having an identical apex angle are oppositely placed in reverse to each other with a fixed predetermined air space therebetween, while an optical axis of said prism unit is tilted by a predetermined angle with respect to a main ray of a bundle of rays subjected to astigmatism correction.

3. In an image-forming optical system the combination comprising:

an astigmatism correcting element disposed between an image-forming lens and an image-forming surface in order to correct said astigmatism wherein, said element comprises a prism unit in which a pair of wedge-like prisms having an identical apex angle are oppositely placed in reverse to each other with a fixed predetermined air space therebetween; and a prism unit supporting means which supports said prism unit such that an optical axis thereof can be tilted with respect to an optical axis of said image-forming optical system.

4. In an image-forming optical system the combination comprising:

an astigmatism correcting element disposed between an image-forming lens and an image-forming surface in order to correct said astigmatism and wherein said element comprises a prism unit in which a pair of wedge-like prisms having an identical apex angle are oppositely placed in reverse to each other with a fixed predetermined air space therebetween; and a prism unit supporting means which supports said prism unit such that an optical axis thereof can be tilted with respect to a main ray in a bundle of rays subjected to astigmatism correction.

* * * * *